United States Patent [19]

Payne

[11] 4,334,411
[45] Jun. 15, 1982

[54] UNIQUE AIR CYCLE REFRIGERATION SYSTEM

[75] Inventor: George K. Payne, Rancho Palos Verdes, Calif.

[73] Assignee: The Garrett Corporation, Los Angeles, Calif.

[21] Appl. No.: 129,545

[22] Filed: Mar. 11, 1980

[51] Int. Cl.³ .............................................. F25B 9/00
[52] U.S. Cl. ........................................ 62/86; 62/172; 62/402
[58] Field of Search ...................... 62/86, 87, 172, 402

[56] References Cited

U.S. PATENT DOCUMENTS

| | | | |
|---|---|---|---|
| 2,557,099 | 6/1951 | Green | 62/402 |
| 2,704,925 | 3/1955 | Wood | 62/86 |
| 2,721,456 | 10/1955 | Whitney, Jr. et al. | 62/402 |
| 2,730,874 | 1/1956 | Schelp | 62/402 |
| 2,767,561 | 10/1956 | Seeger | 62/87 |
| 3,120,109 | 2/1964 | Weil | 62/172 |
| 3,355,902 | 12/1967 | Berhold | 62/156 |
| 3,878,692 | 4/1975 | Steves | 62/87 |

OTHER PUBLICATIONS

"Hamilton Standard" Brochure: R76-3WR Recirculating Air Cycle A/C System, Mar. 12, 1976.

Primary Examiner—Ronald C. Capossela
Attorney, Agent, or Firm—Joel D. Talcott; Albert J. Miller

[57] ABSTRACT

An air cycle refrigeration system in which cabin exhaust air is utilized to regeneratively cool the pressurized working fluid before expansion thereof through a cooling turbine and introduction in the cabin.

36 Claims, 4 Drawing Figures

UNIQUE AIR CYCLE REFRIGERATION SYSTEM

BACKGROUND OF THE INVENTION (1) Field of the Invention

This invention pertains to the art of fluid conditioning apparatus, systems and methods, and is more particularly concerned with air cycle refrigeration apparatus employed in air conditioning systems for the ventilation air distribution to the cabins or other compartments of aircraft.

(2) Description of the Prior Art

Life support air for the occupants of an aircraft cabin or compartment is extracted from the ambient atmosphere, after which it is compressed by the engine or engines of the aircraft or by an auxiliary power unit or units, cooled by heat exchange with ambient ram air, cooled further by adiabatic expansion in an expansion turbine, tempered by addition of warm bypass air if necessary, and then admitted to the cabin air induction and distribution system. This basic step-by-step treatment of the air is inherent in practically all of the more complex systems ranging from various arrangements of simple systems through the more elaborate bootstrap and shoe-string systems, and the like. The air extracted from ambient usually has entrained moisture of varying amounts (and which may be present in vapor, mist or droplet form) which must be accounted for in the design of the air conditioning system, primarily because the entrained moisture condenses and usually freezes at some point downstream of the expansion thereof.

Furthermore, the efficiency of the system is greatly enhanced where the system design results in turbine air outlet temperatures as near to, or even below, the freezing point of water.

As much as possible of the entrained moisture in the air is removed in the air conditioning system by means of coalescers, water separators, water traps and the like. One hundred percent removal is not possible, hence the introduction of the air from the system into the cabin air distribution ducts, according to the prior art, takes place with the air at a temperature above freezing point of water in order to minimize icing in the downstream air ducts. As stated, warm bypass air is modulated into the airstream to provide low limiting of the duct air to a temperature of about 35°–37° F.

Systems of the prior art employing the basic step-by-step method briefly outlined above, are subject to certain limiting factors which result in degradation of system performance and lowered efficiency. For example, it is known that the cooling capacity of a particular system can be greatly enhanced by operating the expansion turbine with exhaust air temperatures below the freezing point of water. Yet to do so would require greatly increased hot bypass air and thus result in serious degradation of performance. If, on the other hand, the amount of hot bypass air (required to temper the turbine exhaust air) is to be held at a bare minimum, then the expanded air has to be at a temperature above freezing of the entrained water vapor, mist, or droplets. This means that the turbine and associated components of the air conditioning unit are not operating in an efficient manner under conditions which may be dictated by a broad range of parameters of a problem statement.

SUMMARY OF THE INVENTION

The concept of the present invention may be employed to enhance the operation of air cycle refrigeration systems based on simple, bootstrap, shoestring or other system configurations of a like nature in the prior art.

Accordingly, it is a general object of the invention to provide an unique air cycle refrigeration system configuration adaptable to systems of the prior art. It is another general object to provide such a system by incorporating in systems of the prior art simple and inexpensive components to enable them to operate more efficiently and with little or no system degradation such as is usually present with hot compressed air bypass conditions required in the prior art.

It is a particular object in that connection to provide a system in which the warming of the expanded and cooled air admitted to the cabin is provided by recirculation of at least a portion of the cabin or compartment air through a duct whose output is coupled to the cabin air induction means downstream from the supply air expansion and cooling means.

It is another particular object to provide a system in which a heat exchanger means has first and second passageway means in heat exchange relationship, with the first passageway means disposed in the supply air path upstream of the expansion and cooling means and with the second passageway means disposed in a passageway for air from the cabin in order to cool the supply air flowing through the first passageway means. Further, in connection with the said another particular object it is yet a further particular object to dispose the second passageway means in the flowpath of the cabin air exhaust to ambient atmosphere.

It is yet another object to provide such a system with air pumping or moving means to assure movement of the recirculation air and of the air from the cabin flowing through the second passageway means.

It is another object of the invention to utilize at least a portion of the work output of the expansion and cooling means to actuate air moving means disposed in the cabin air recirculating path and/or in the pathway through the second passageway means of the heat exchange means.

In aircraft use, the basic object of the invention is to provide maximum possible cooling capacity with the lowest possible engine bleed air flow, while providing adequate removal of the moisture from the fresh air supply and adequate ventilation for the occupants of the conditioned air space.

Other and further objects will be apparent at once to those skilled in the art upon consideration of the drawings in connection with the description herein told.

DESCRIPTION OF THE PREFERRED EMBODIMENTS

The invention has important utility in aircraft for providing properly conditioned air to the crew and passenger compartments or other enclosed spaces, and will be described in that context although it will be recognized by those skilled in the art that the invention has broader potential and is not to be construed as being limited in that respect.

Figure 1:
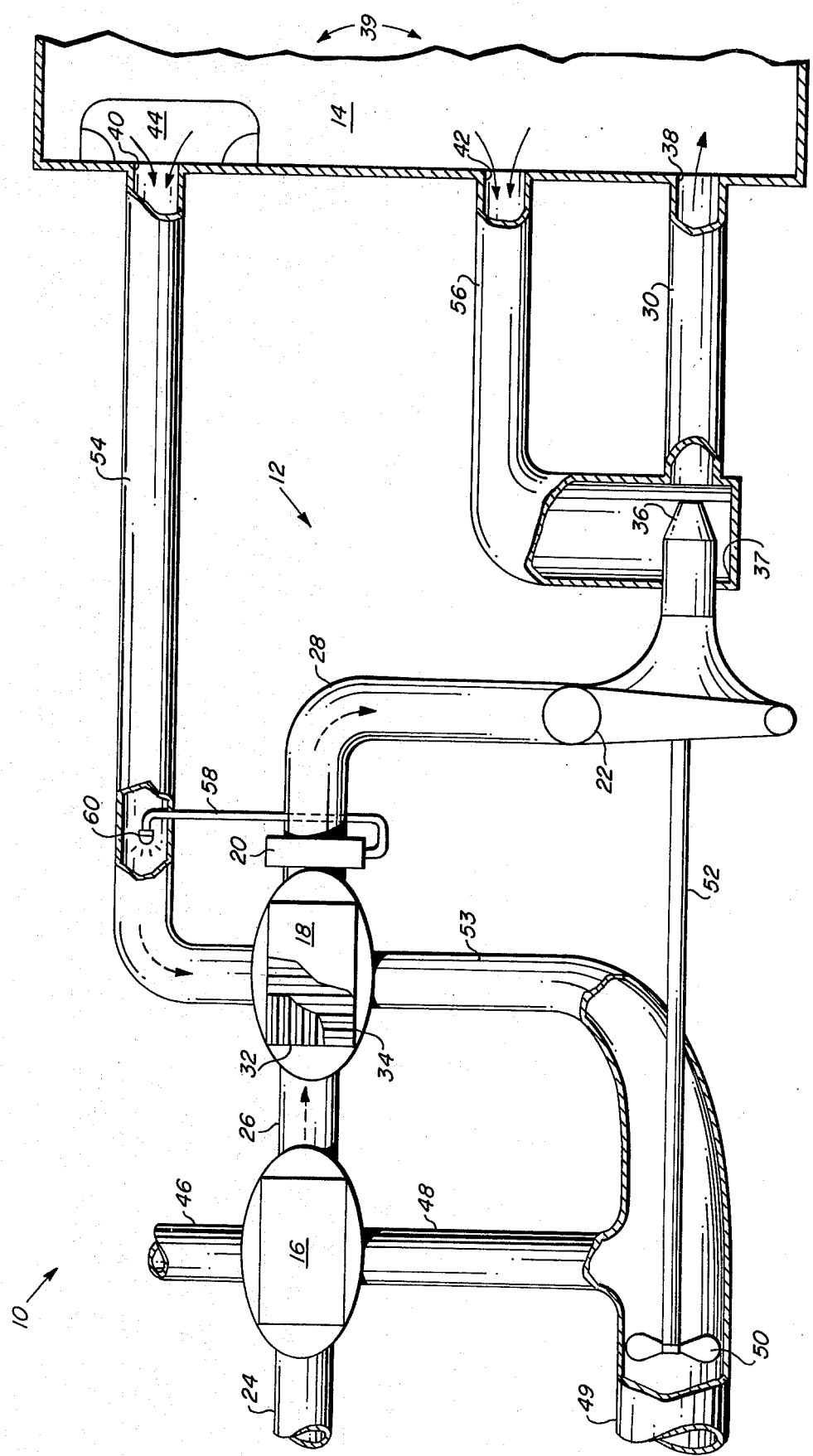
FIG. 1 is a system schematic embodying a preferred form of the invention.

Referring to FIG. 1, there is depicted a schematic of a unique air cycle refrigeration system 10 defining a duct means 12 providing a flow path for elastic fluid from a pressurized source thereof (not shown) to a compartment or enclosed space 14 which is to be provided with a continuous flow of the elastic fluid in a cooled or refrigerated state, generally at a pressure substantially less than that of the source. In practice, the source for the pressurized elastic fluid or air required on board an aircraft would be either the compressor sections of the aircraft's jet propulsion engines or an auxiliary power unit for use when the aircraft is on the ground with the main engines not running.

The flow path includes passageways in heat exchange means 16 and 18, a water trap or separator means 20, and an air expansion turbine or other like energy extraction means 22, together with associated ducts and conduit means 24, 26, 28 and 30, as follows. The duct means 24 couples the source of pressurized air (not shown) to the inlet of the first passageways means (also not shown) of the heat exchange means 16. The outlet of the first passageway means is coupled by the duct means 26 to the inlet of a first passageway means 32 of the heat exchange means 18. As will be noted, the first passageway means 32 is comprised of a plurality of passageway paths in heat exchange with a plurality of passageway paths comprising a second passageways means 34.

Both of the heat exchange means 16 and 18 are preferably of the plate-fin configuration in which the first and second passageway means are disposed in cross-flow heat exchange relationship. Also in one preferred embodiment, the heat exchange means 16 and 18 are disposed in a unit arrangement wherein the first passageways means of the heat exchange means 18 are extensions of the like first passageways means of the heat exchange means 16, and with the second passageways means of both the heat exchange means being separated from each other by a single common wall. This arrangement eliminates the duct means 26, and also results in other manufacturing and assembly savings.

The outlet of the first passageways means 32 communicates through the water separator or trap 20 and thence through the duct means 28 to the intake of the expansion turbine 22 whose discharge communicates through a jet pump nozzle means 36 disposed in a muff 37 at the discharge from the turbine 22. The turbine discharge air from the nozzle means 36 and the duct means 30 flows through an inlet port 38 of the compartment 14. Cabin air outlet means 39 of the compartment 14 comprise outlet port means 40 and 42, with the usual cabin pressure regulator outflow and safety valve 44 disposed to control the cabin air exhaust through the port 40.

Referring to the heat exchange means 16, the inlet of the second passageway means (not shown) is coupled to a ram air inlet duct 46, and the outlet is coupled to a ram air exhaust duct 48 which merges with an overboard discharge duct 49. To assist the ram air flow through the inlet duct 46 through the second passageway means of the heat exchange means 16 and the outlet duct 48, an air pump means comprised of a fan 50 is disposed in the duct 49. The fan 50 is driven by a shaft 54 coupled to receive power output from the expansion turbine 22. Merging also with the overboard duct 49 is a discharge duct 53 which is coupled to the discharge of the second passageway means 34 whose inlet is coupled by a duct 54 with the cabin port 40 to provide regenerative heat exchange between cabin exhaust air and the supply air in the first passageway means 32. The uniqueness of the present invention according to FIG. 1 is the addition to such a system of a recirculation duct 56 disposed between the cabin outlet port means 42 and the inlet to the muff 37, whereby cabin recirculated air is pumped through the duct 56 by the action of the jet pump nozzle 36 to mix with and warm the discharge air from the turbine 22. To enhance the effectiveness of the heat exchange means 18, the water collected by the trap 20 is conveyed by a conduit pipe 58 to a discharge spray nozzle 60 disposed in the duct 54 immediately upstream of the inlet to the second passageway means 34.

Operation of the embodiment of FIG. 1 is as follows. Hot compressed air provided by either an auxiliary power unit or by bleed from the gas turbine engines is conveyed by the duct 24 to the cooling passageways provided by the first passageway means of the heat exchange means 16 (where it is cooled to about that of the ambient ram air flowing through the duct 46 and thence through the second passageway means and the discharge means duct 48, where it is forcibly discharged back to ambient through the duct 49 by the fan 50). The partially cooled supply air in the said first passageway means then flows through the duct 26 to the first passageway means 32 of the heat exchange means 18 where it is further cooled to about the temperature of the cabin air by heat exchange with cabin air flowing through the second passageway means 34. It will be noted that the heat of vaporization of the water emitted by the nozzle 60 enhances the cooling effect of the cabin exhaust air admitted to the second passageway means 34.

Because of the high pressure, moderate temperature bleed air conditions in the first passageway means 34, the bleed supply air is usually cooled below its dew point, and a substantial portion of the entrained moisture condenses from the supply air.

After leaving the first passageway means 32, the air, which now contains entrained water in the condensed form of mist or droplets, passes through the water separator or trap 20 where the condensed water is collected. From the trap the cooled bleed supply air traverses the duct 28 to the intake of the turbine 22 where it is expanded substantially adiabatically and thereby cooled for discharge from the turbine into the cabin air supply duct 30. The air at this point contains free moisture not removed by the trap 20, and is of a temperature well below the freezing point. To prevent the accumulation of ice in the supply ducting, warm air must be added to bring the mixed air temperature above freezing.

It has been customary in the prior art to supply the warm air with a bypass duct coupled to the upstream hot compressed air (coupled, for example, to the supply duct 24) to raise the turbine discharge air temperature above the moisture freezing point. With the present invention, all (or substantially all) of the warming of the turbine discharge air is performed by recirculation of cabin air. In the case of FIG. 1 the recirculated air is pumped by the jet pump nozzle 36 from the cabin 14 through the duct 56 to mix with the cold discharge air from the turbine 22, and thereafter flows through the supply duct 30, eliminating all, or substantially all of the extraction of upstream hot compressed air.

Figure 2:
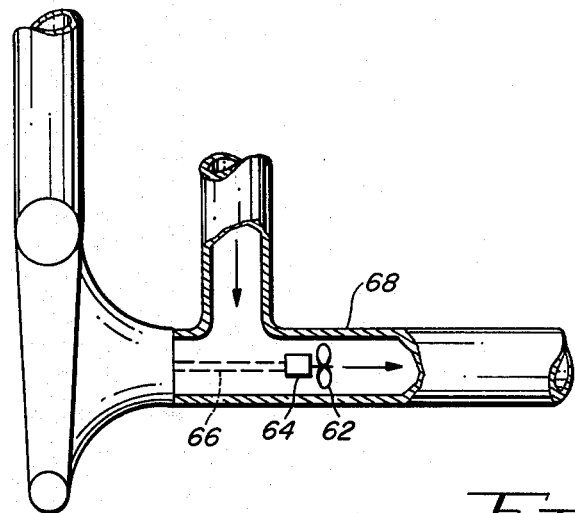
FIGS. 2, 3 and 4 are partial schematics of various recirculation air moving means other than those shown on FIG. 1.
Figure 3:
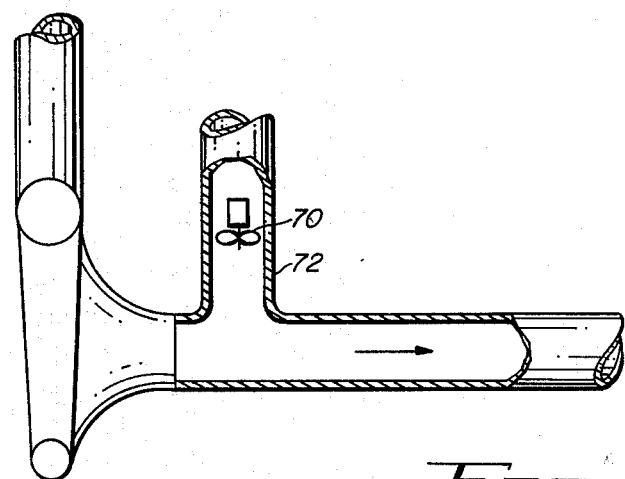
Figure 4:
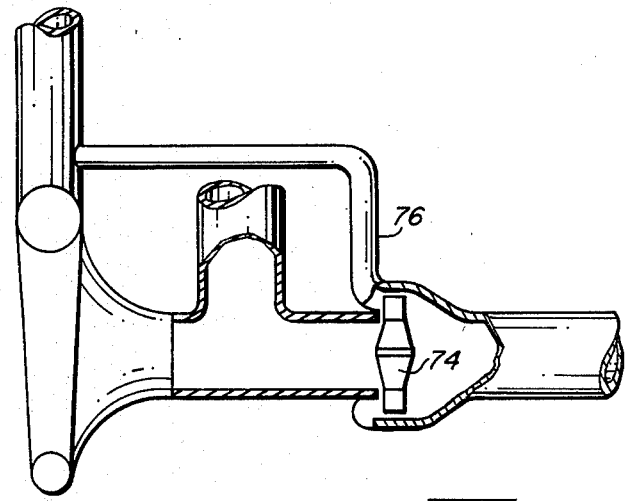

As will be apparent to those skilled in the art, the arrangement of the jet pump 36 of FIG. 1 is merely exemplary as one of various means to effect the recirculation flow of compartment air. FIGS. 2, 3 and 4 illustrate various other ways in which the recirculation flow can be brought about. On FIG. 2, a fan 62, driven either by a motor 64 or an output shaft 66 of the turbine, provides full flow in the duct 68. On the other hand, in some cases it might be advantageous to utilize means to effect flow only of the recirculation air along the lines of the arrangement depicted on FIG. 3 by the motorized fan 70 in the recirculation duct 72. In connection with the fan 70, it will be apparent that shaft power, or other transmission means energized as output power from the turbine may be used to supply power to the fan 70. FIG. 4 depicts schematically a turbine fan arrangement 74 in which the single wheel thereof combines turbine blades around the periphery of the fanblades. A conduit 76 delivers a small bleed of air from the duct means upstream from the expansion turbine. The inner fanblades function in full flow mode for the turbine discharge air, recirculating air, and the turbine blade discharge.

SUMMARY

From the description above in connection with the drawings, the stated objects of the invention are achieved. It will be remembered that the lowest possible temperature which can be supplied to a conditioned-air-distribution system is a value in excess of 32 degrees F., in order to preclude any possibility of ice accumulation in the ducting, which could or would obstruct airflow. The required fresh air supply to achieve a given cooling capacity is equal to the cooling load divided by the temperature rise from the compartment inlet to the compartment outlet. This temperature differential is normally about 40° F. assuming a 35° F. supply temperature (the effective temperature or "dry air rated" temperature will be lower when free moisture is present) and a 75° F. cabin.

While it is possible for most air cycle systems to deliver at the turbine discharge a temperature well below freezing, the conventional means of protecting the distribution system against icing involves bypassing hot, high pressure air from the air source to a mixing muff directly at the turbine discharge. This bypass air, being at a temperature higher than the desired temperature of the compartment to be cooled, causes a reduction in the cooling potential when utilized. The maximum cooling capability is then limited to that which occurs with no bypass air and with an above-freezing-discharge temperature. This condition fixes the through flow capacity of the system.

With the present invention, the ice protection function is handled by recirculation air from the compartment to be cooled. This air, being at the temperature of the compartment, has no influence on the cooling capability of the cold air supplied by the expansion turbine, but can be used to increase the compartment supply air temperature to a value above freezing. Without any restriction then, on the turbine discharge temperature, all possible means can be used to reduce this temperature.

The recirculation method of providing ice protection also provides a desirable increase in the ventilation rate within the occupied compartment. The condensation and removal of water at the turbine inlet provides all the moisture reduction necessary for the comfort of the occupants of the compartment. The use of a conventional mechanical, low pressure separator is not necessary. The complete refrigeration task can be accomplished by a single heat exchanger assembly and a single piece of rotating machinery.

I claim:

1. A fluid conditioning system for working fluid provided by a source thereof and to be supplied to a substantially enclosed space having fluid inlet and a plurality of fluid outlet port means, comprising:
    (a) heat exchange means having first and second fluid passageways in heat exchange relationship, each of said fluid passageways having fluid inlet and outlet means, said fluid inlet means of said first fluid passageway being coupled to the working fluid source;
    (b) fluid energy extraction means defining a fluid passageway having fluid inlet and outlet means;
    (c) first duct means coupled between said fluid outlet means of said first fluid passageway of said heat exchange means and said fluid inlet means of said fluid energy extraction means;
    (d) second duct means coupled between one of the outlet port means of the enclosed space and said fluid inlet means of said second fluid passageway of said heat exchange means; and
    (e) third duct means having an inlet means coupled to said fluid outlet means of said fluid energy extraction means and having fluid outlet means coupled to the fluid inlet port means of the enclosed space, said third duct means having fluid inlet port means disposed intermediate said outlet means of said fluid energy extraction means and said fluid outlet means of said third duct means.

2. The system of claim 1 further comprising recirculating conduit means having fluid recirculating inlet means coupled to one of the outlet port means of the enclosed space, and having fluid recirculating outlet means coupled to said third duct means upstream from said outlet means thereof.

3. The system of claims 1 or 2 further comprising fluid conduction means coupling the outlet of said second passageway of said heat exchange means to a sink of fluid at a pressure lower than that in the enclosed space.

4. The system of claims 1 or 2 further comprising fluid conduction means coupling the other of the outlet port means of the enclosed compartment to said flow path upstream from the inlet port means of the enclosed space.

5. The system of claims 1 or 2 further comprising fluid pumping means disposed in the system to effect recirculation of a working fluid from one of the outlet port means of the enclosed space through said working fluid flowpath downstream of said first passageway of said heat exchange means to the inlet port means of the enclosed space.

6. The system of claims 1 or 2 further comprising fluid jet pump means disposed in the system to effect recirculation of the working fluid from one of the outlet port means of the enclosed space through said working fluid flowpath downstream of said first passageway of said heat exchange means to the inlet port means of the enclosed space.

7. The system of claims 1 or 2 further comprising fluid fan pumping means disposed in the system to effect recirculation of the working fluid from one of the outlet port means of the enclosed space through said working fluid flowpath downstream of said first passageway of said heat exchange means to the inlet port means of the enclosed space.

8. The system of claim 2 further comprising fluid pumping means disposed in said recirculating conduit means.

9. The system of claim 2 further comprising fluid jet pumping means disposed in said recirculating conduit means.

10. The system of claim 2 further comprising fluid fan pumping means disposed in said recirculating conduit means.

11. The system of claims 1 or 2 further characterized in that the working fluid comprises an elastic fluid and said fluid energy extraction means comprises an elastic fluid expansion engine means.

12. The system of claims 1 or 2 further characterized in that the working fluid comprises an elastic fluid and said fluid energy extraction means comprises an elastic fluid expansion turbine means.

13. The system of claims 1 or 2 further characterized in that the working fluid comprises an elastic fluid, said fluid energy extraction means comprises an elastic fluid expansion engine means, and said first fluid passageway of said heat exchange means is disposed in said working fluid flowpath upstream from said fluid passageway of said fluid energy extraction means.

14. The system of claims 1 or 2 further characterized in that the working fluid comprises an elastic fluid, said fluid energy extraction means comprises an elastic fluid expansion turbine means, and said first fluid passageway of said heat exchange means is disposed in said working fluid flowpath upstream from said fluid passageway of said fluid energy extraction means.

15. A fluid conditioning system for a working fluid provided by a source thereof to an enclosed space having a fluid inlet and a plurality of fluid outlet port means, comprising:
   (a) passageway means defining a flowpath for the working fluid, and having inlet means coupled to the source and outlet means coupled to the inlet port means of the enclosed space;
   (b) fluid conditioning unit means disposed in said flowpath and adapted to change the energy state of the fluid from that of the fluid at the source to that useable in the enclosed space, said fluid conditioning unit means comprising heat exchange means having first and second passageway means providing heat exchange between the fluid flowing through said passageways, said first passageway means being disposed in said flowpath;
   (c) first fluid flowpath means coupling the interior of the enclosed space with said flowpath through one of the outlet port means of the enclosed space; and
   (d) second fluid flowpath means coupling the interior of the enclosed space with the exterior thereof through the other of port means of the enclosed space.

16. A fluid conditioning system according to claim 15 further characterized in that said fluid conditioning means comprises fluid energy extraction means disposed in said working fluid flowpath downstream from said first passageway means.

17. A fluid conditioning system according to claim 16 further characterized in that the working fluid comprises an elastic fluid, and said fluid energy extraction means comprises an elastic fluid expansion engine means for expanding the working fluid from a pressure substantially that of the source to substantially that of the enclosed space.

18. A fluid conditioning system according to claim 17 further characterized in that said elastic fluid expansion engine means comprises an elastic fluid expansion turbine means for expanding the working fluid substantially adiabatically from a pressure substantially that of the source to substantially that of the enclosed space.

19. The system of claims 15, 16, 17 or 18 further comprising fluid pumping means disposed in the system to effect recirculation of the working fluid from one of the outlet port means of the enclosed space through said working fluid flowpath downstream of said first passageway of said heat exchange means to the inlet prot means of the enclosed space.

20. The system of claims 15, 16, 17, or 18 further comprising fluid jet pump means disposed in the system to effect recirculation of the working fluid from one of the outlet port means of the enclosed space through said working fluid flowpath downstream of said first passageway of said heat exchange means to the inlet port means of the enclosed space.

21. The system of claims 15, 16, 17 or 18 further comprising fluid fan pumping means disposed in the system to effect recirculation of the working fluid from one of the outlet port means of the enclosed space through said working fluid flowpath downstream of said first passageway of said heat exchange means to the inlet port means of the enclosed space.

22. In an aircraft having a compressed air source for supplying air to a compartment having inlet and a plurality of outlet port means, an air conditioning system comprising:
   (a) first heat exchange means having first and second passageways providing heat exchange between the fluids flowing therethrough;
   (b) second heat exchange means having first and second passageways providing heat exchange between the fluids flowing therethrough;
   (c) an expansion turbine means defining a passageway having inlet and outlet ports;
   (d) first duct means coupling the source to the inlet of said first passageway of said first heat exchange means;
   (e) second duct means coupling said outlet of said first passageway of said first heat exchange means with said inlet of said first passageway of said second heat exchange means;
   (f) third duct means coupling said outlet of said first passageway of said second heat exchange means with said passageway inlet port of said expansion turbine means;
   (g) fourth duct means coupling said passageway outlet port of said expansion turbine means with the inlet port means of the cabin;
   (h) fifth duct means coupling one of the outlet port means of the cabin to the inlet of said second passageway of said second heat exchange means;
   (i) recirculating conduit means having an inlet coupled to the other of the outlet port means of the cabin and having an outlet coupled with said fourth duct means; and
   (j) ram air duct means arranged to conduct ram air to the inlet of said second passageway of said first heat exchange means.

23. In an aircraft providing pressurized ventilation air from a source thereof through heat exchange and air expansion means to a compartment, wherein the compartment has an inlet port and a pair of outlet ports, the method of conditioning the air, comprising the steps of:
   (a) directing the flow of pressurized air through a main flowpath including first passageway means of the heat exchange means and the expansion passageway of the turbine, from the source to the air inlet port of the compartment;

(b) directing, to ambient atmosphere, compartment airflow from one of the compartment outlet ports;

(c) recirculating, to the main flowpath at a point downstream from the outlet of the turbine expansion pathway, compartment airflow from one of the compartment outlet ports; and (d) directing, to the inlet of second passageway means of the heat exchange means to effect heat exchange between the fluids in said first and second passageway means, compartment airflow from one of the compartment outlet ports.

24. A fluid conditioning system receiving fluid from a pressurized fluid source and providing conditioned fluid to an inhabitable enclosed space having an inlet and an outlet, comprising:

(a) heat exchange means having first and second thermally communicating passageways extending therethrough;

(b) turbine means operable to expand pressurized fluid therethrough to reduce the pressure and temperature of the fluid;

(c) first fluid flow path means for flowing pressurized fluid from the pressurized fluid source sequentially through said first passageway of said heat exchange means and through said turbine means to the inlet of the enclosed space; and (d) second fluid flow path means for flowing fluid from the outlet of the enclosed space through said second passageway of said heat exchange means to ambient to remove heat from the fluid in said first passageway of said heat exchange means.

25. A fluid conditioning system receiving working fluid from a pressurized fluid source and supplying conditioned working fluid to an inhabitable enclosed space having an inlet and an outlet, comprising:

turbine means receiving pressurized working fluid from the pressurized fluid source, expanding the working fluid, and supplying expanded working fluid to the inlet of the enclosed space; and heat exchange means having a first passageway disposed between the pressurized fluid source and said turbine means and a second passageway to receive fluid from the outlet of the enclosed space and discharge said fluid to ambient, said first and second passageways in a heat exchange relationship to transfer heat from the higher temperature pressurized working fluid to the lower temperature fluid from the enclosed space.

26. The fluid conditioning system of claim 24 or 25 further including fluid pumping means operably driven by said turbine means to draw fluid from the outlet of the enclosed space through said second passageway of said heat exchange means.

27. The fluid conditioning system of claim 26 wherein said fluid pumping means is a fan directly connected to said turbine means.

28. A fluid conditioning system receiving fluid from a pressurized fluid source and providing conditioned fluid to the cabin of a moving vehicle, comprising:

(a) first heat exchange means having first and second thermally communicating passageways extending therethrough;

(b) second heat exchange means having first and second thermally communicating passageways extending therethrough;

(c) turbine means operable to expand pressurized fluid therethrough to reduce the pressure and temperature of the fluid;

(d) first fluid flow path means for flowing ram fluid flowing past the moving vehicle through said second passageway of said first heat exchange means;

(e) second fluid flow path means for flowing pressurized fluid from the pressurized fluid source sequentially through said first passageway of said first heat exchange means, through said first passageway of said second heat exchange means, and through said turbine means to the cabin of the moving vehicle, said first heat exchange means transferring heat from the pressurized fluid from the pressurized fluid source to ram fluid flowing past the moving vehicle and said second heat exchange means transferring heat from the fluid from the cabin to the pressurized fluid from the first passageway of said first heat exchange means; and (f) third fluid flow path means for flowing fluid from the cabin through said second passageway of said second heat exchange means to remove heat from the fluid in said first passageway of said second heat exchange means.

29. A fluid conditioning system receiving working fluid from a pressurized fluid source and supplying conditioned working fluid to a cabin of a moving vehicle, comprising:

turbine means receiving pressurized working fluid from the pressurized fluid source, expanding the working fluid, and supplying expanded working fluid to the cabin of the moving vehicle;

first heat exchange means having a first passageway to receive pressurized working fluid from the pressurized fluid source and a second passageway to receive ram fluid flowing past the moving vehicle, said first and second passageways of said first heat exchange means in a heat exchange relationship to transfer heat from the higher temperature pressurized working fluid to the lower temperature ram fluid; and second heat exchange means having a first passageway disposed between said first passageway of said first heat exchange means and said turbine means and a second passageway disposed to receive fluid from the cabin of the moving vehicle, said first and second passageways of said second heat exchange means in a heat exchange relationship to transfer heat from the higher temperature pressurized working fluid from said first passageway of said first heat exchange means to the lower temperature fluid from the cabin of the moving vehicle.

30. The fluid conditioning system of claim 28 and in addition recirculation fluid flow path means for delivering fluid from the cabin to the second fluid flow path means between said turbine means and said cabin.

31. The fluid conditioning system of claim 28, 29 or 30 further including fluid pumping means operably driven by said turbine means to draw ram fluid flowing past the moving vehicle through said second passageway of said first heat exchange means and fluid from cabin of the moving vehicle through said second passageway of said second heat exchange means.

32. The fluid conditioning system of claim 31 wherein said fluid pumping means is a fan directly connected to said turbine means.

33. The fluid conditioning system of claim 31 wherein water vapor in the working fluid is condensed in said first passageway of said second heat exchange means and in addition:
  water separator means disposed between said first passageway of said second heat exchange means and said turbine means; and
  means to transfer water removed from the working fluid by said water separator means to the fluid from the cabin of the moving vehicle upstream of said second passageway of said second heat exchange means.

34. A fluid conditioning system receiving fluid from a pressurized fluid source and providing conditioned fluid to an enclosed space having an inlet and two outlets, comprising:
  (a) heat exchange means having first and second thermally communicating passageways extending therethrough;
  (b) turbine means operable to expand pressurized fluid therethrough to reduce the pressure and temperature of the fluid;
  (c) first fluid flow path means for flowing pressurized fluid from the pressurized fluid source sequentially through said first passageway of said heat exchange means and through said turbine means to the inlet of the enclosed space; and
  (d) second fluid flow path means for flowing fluid from one outlet of the enclosed space through said second passageway of said heat exchange means to ambient to remove heat from the fluid in said first passageway of said heat exchange means; and
  (e) recirculating fluid flow path means for flowing fluid from the other outlet of the enclosed space to said first fluid flow path means between said turbine means and the inlet of the enclosed space.

35. A method of conditioning a working fluid from a pressurized source to provide conditioned working fluid to a cabin of a moving vehicle, comprising the steps of:
  cooling the working fluid from the pressurized working fluid source with ram air flowing past the moving vehicle and working fluid exhausted from the cabin of the moving vehicle;
  expanding the thus cooled working fluid to a sub-freezing temperature; and
  mixing a portion of the working fluid from the cabin of the moving vehicle with the sub-freezing working fluid from the expanding step and providing the thus mixed working fluid to the cabin of the moving vehicle.

36. The working fluid conditioning method of claim 35 and in addition:
  separating from the working fluid any water condensed in the cooling step and adding the separated water to the working fluid exhausted from the cabin of the moving vehicle before the cooling step.

* * * * *